US008186167B2

(12) United States Patent
Chila et al.

(10) Patent No.: US 8,186,167 B2

(45) Date of Patent: May 29, 2012

(54) COMBUSTOR TRANSITION PIECE AFT END COOLING AND RELATED METHOD

(75) Inventors: Ronald J. Chila, Greer, SC (US); Kevin W. McMahan, Greer, SC (US)

(73) Assignee: General Electric Company, Schenectady, NY (US)

( * ) Notice: Subject to any disclaimer, the term of this patent is extended or adjusted under 35 U.S.C. 154(b) by 877 days.

(21) Appl. No.: 12/216,515

(22) Filed: Jul. 7, 2008

(65) Prior Publication Data

US 2010/0003128 A1 Jan. 7, 2010

(51) Int. Cl.
*F02C 7/08* (2006.01)

(52) U.S. Cl. .......................................... 60/752; 415/134

(58) Field of Classification Search .................. 415/134; 60/752

See application file for complete search history.

(56) References Cited

U.S. PATENT DOCUMENTS

| | | | | |
|---|---|---|---|---|
| 5,400,586 | A * | 3/1995 | Bagepalli et al. | 60/800 |
| 5,724,816 | A * | 3/1998 | Ritter et al. | 60/752 |
| 6,334,310 | B1 * | 1/2002 | Sutcu et al. | 60/752 |
| 2005/0063816 | A1 * | 3/2005 | Jorgensen | 415/110 |

* cited by examiner

*Primary Examiner* — Matthew Landau
*Assistant Examiner* — Robert Bachner
(74) *Attorney, Agent, or Firm* — Nixon & Vanderhye, P.C.

(57) ABSTRACT

A transition duct for a gas turbine includes a tubular body having a forward end and an aft end; a plurality of cooling channels formed on an exterior surface of the tubular body at the aft end; a closure band surrounding the aft end, covering at least a portion of the cooling channels; and a seal attached to the closure band, surrounding the aft end of the tubular body.

13 Claims, 2 Drawing Sheets

COMBUSTOR TRANSITION PIECE AFT END COOLING AND RELATED METHOD

This invention relates to gas turbine combustor technology generally, and to an apparatus and related method for cooling the aft end of a transition pieces or duct that extends between a combustor and the first stage of the turbine.

BACKGROUND OF THE INVENTION

Typically, transition ducts have an aft frame which is attached, or integrated into, the aft end of the duct, facilitating attachment of the duct to the inlet of the turbine first stage. The aft frame is often cooled by means of controlled seal leakage and small cooling holes that allow compressor discharge air to pass through the frame. It has proven difficult, however, to cool the aft end of transition ducts which do not have an aft frame integrally formed with, or attached to the duct body. In accordance with exemplary but nonlimiting implementation of this invention, forced convection and potentially impingement cooling are used as a means to directly cool a transition duct which does not have an aft frame structure.

Accordingly, in one aspect, the present invention relates to a transition duct for a gas turbine comprising: a tubular body having a forward end and an aft end; a plurality of cooling channels formed on an exterior surface of the tubular body at the aft end; a closure band surrounding the aft end, covering at least a portion of the plurality of cooling channels; and a seal attached to the closure band, surrounding the aft end of the tubular body.

In another aspect, the present invention relates to a method of providing cooling air to an aft end of a gas turbine transition duct comprising: forming plural open cooling channels on an exterior surface of the transition duct at the aft end thereof, the plural cooling channels extending from an aft edge of the duct in an upstream direction; closing at least a portion of the plural open cooling channels with a peripheral closure band to thereby form cooling passageways; and incorporating a seal into the closure band.

The invention will now be described in greater detail in connection with the drawings identified below.

DETAILED DESCRIPTION OF THE INVENTION

Figure 1:
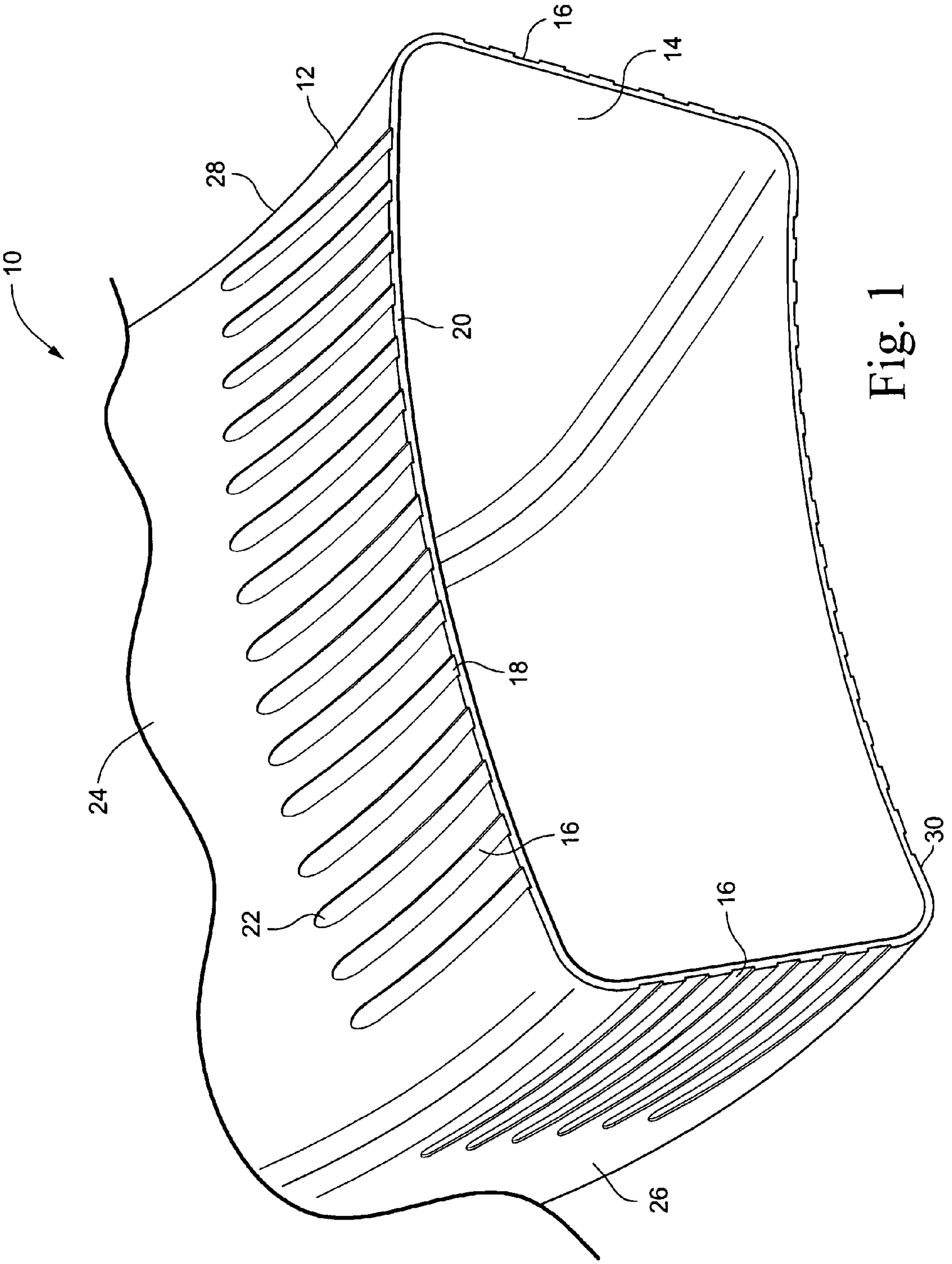
FIG. 1 is a partial aft end perspective view of a turbine transition duct with cooling channels formed therein.

In a typical can-annular combustor configuration in a gas turbine, an array of combustors surrounding the turbine rotor supply hot combustion gases to the turbine first stage via a corresponding array of transition ducts that extend between the combustors and the first stage inlets. With reference to FIG. 1, one such transition duct 10 connects at a forward end to a combustor liner (not shown). The aft end 12 of the transition duct in the exemplary embodiment has no integral or attached aft frame surrounding the outlet 14, thus making it difficult to adequately cool the aft end. The aft end 12 is received within a bracket (not shown) fixed to first stage turbine nozzle and formed with a correspondingly-shaped aperture. In this kind of arrangement, cooling techniques commonly employed to cool the aft end of a transition piece that does utilize an aft frame (which provides a ready vehicle for incorporating cooling geometry), are not available.

Accordingly, in one nonlimiting implementation, an array of cooling channels or grooves 16 are formed on the exterior surface of the aft end 12 of the transition duct 10. The cooling channels 16 provide cooling air outlets 18 at the aft edge 20 of the duct 10, extending toward the opposite end of the duct. The channels terminate at respective tapered inlets 22, the axial location of which may be varied as dictated by combustor and duct design, cooling requirements, etc.

Figure 2:
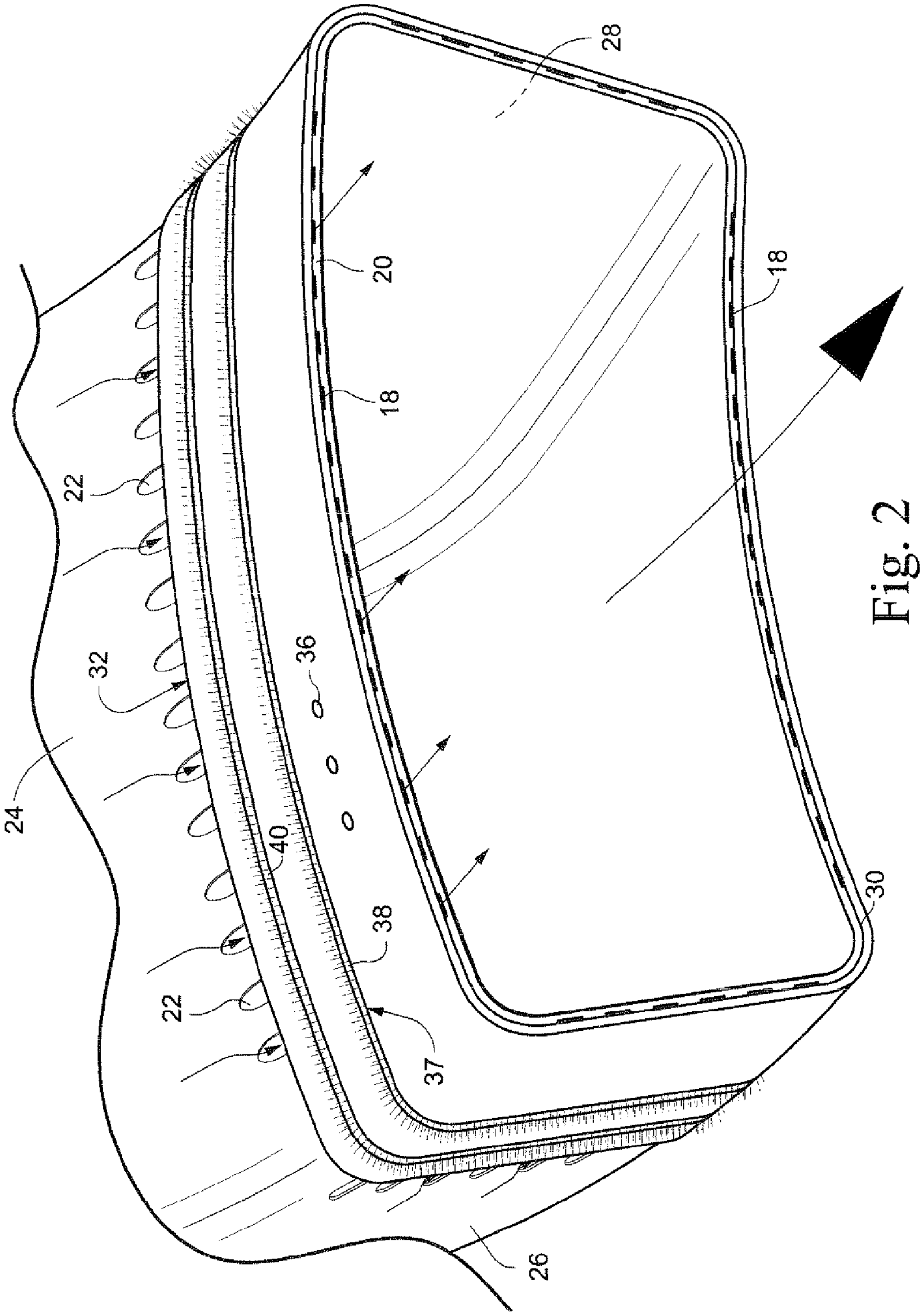
FIG. 2 is a perspective view similar to FIG. 1 but with a band enclosing portions of said cooling channels, and with a seal attached to the band.

The cooling channels 16 may be provided on one, all or any combination of the exterior top surface 24, side surfaces 26, 28, and bottom surface 30 of the duct, and the number of channels or grooves in each of those surfaces may also vary as desired. The channels 16 may be formed by means of any acceptable manufacturing process, e.g., milling, casting, laser etching, drop forging, etc.), and may be of any suitable cross-sectional shape including rectangular as shown in FIGS. 1 and 2, but also including semi-circular, oval, V-shaped etc.

The channels 16 are substantially closed at the top by a metal wrap or closure band 32 (FIG. 2) that surrounds the transition duct, thus forming closed-periphery passageways having substantially rectangular-shaped cross sections. The band 32 extends axially from the aft edge 20 to the tapered inlets 22, leaving the latter exposed for facilitating entry of air into the channels. The band 32 may be fastened to the duct by any suitable process including bolting or welding.

The interior surfaces of the cooling channels may also be formed or provided with any of several known means for heat transfer enhancement applied to one, all, or any combination of bounding walls of the cooling channels. Such surface enhancement means include turbulators, fins, dimples, cross-hatch grooves, sand-dune shapes, chevrons or any combination thereof. The arrangement and number of such enhancements may be varied as desired among the various channels. Cooling air may be delivered to the channels 16 in any number of ways. For example, the channels 16 may be exposed, via inlets 22, at their upstream ends to compressor discharge flow, or they may be fed directly from a separate inlet or manifold. Alternatively, or additionally, the cooling channels 16 may be fed from any number of cooling apertures 36 (three shown in FIG. 2) provided in the band 32. For example, one or more cooling apertures could be provided in overlying relationship with any one or more of the channels 16.

It is also a feature of the exemplary embodiment to combine a seal 36 with the closure band 32. The seal 36 is shown schematically in FIG. 2 to include a pair of brush seal bands 38, 40 but the seal may also be composed of may any of a variety of other conventional seals such as leaf seals, cloth seals, rope seals hula seals and the like. As noted above, the aft end of the transition piece will be received within a bracket assembly that is correspondingly-shaped aperture in a fixed to the stage 1 nozzle of the turbine. By incorporating a peripheral seal into the wrap or closure band 32, air in the compressor discharge chamber will be prevented from leaking into the cavity between the bracket and the turbine first stage inlet.

Note that the above-described aft end cooling arrangement can be used with or without conventional impingement cooling sleeves that are used to impingement cool areas of the duct upstream of the aft end.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transition duct for a gas turbine comprising:

a tubular body having a forward end and a frameless aft end said forward end adapted for connection to a combustor liner and said aft end adapted for connection to a first stage nozzle component;

a plurality of cooling channels formed on an exterior surface of said tubular body at said aft end, said plurality of cooling channels having inlets proximate said aft end;

a closure band surrounding said aft end, covering at least a portion of said plurality of cooling channels; and a peripheral seal attached to said closure band, surrounding said closure band and said aft end of said tubular body, said peripheral seal adapted for engagement with the first stage nozzle component.

2. The transition duct of claim 1 wherein said plurality of cooling channels are formed with inlet ends and outlet ends, said outlet ends located at an aft edge of said transition duct.

3. The transition duct of claim 2 wherein said inlet ends comprise tapered surface portions that are not covered by said closure band.

4. The transition duct of claim 1 wherein said closure band is formed with a plurality of cooling apertures overlying one or more of said plurality of cooling channels.

5. The transition duct of claim 1 wherein means are provided within said plurality of cooling channels for enhancing heat transfer.

6. The transition duct of claim 1 wherein said peripheral seal is selected from a group comprising brush seals, leaf seals, cloth seals, rope seals and hula seals.

7. The transition duct of claim 1 wherein said peripheral seal comprises a brush seal.

8. A method of providing cooling air to an aft end of a gas turbine transition duct attachable to a combustor liner at a forward end of the transition duct and to a turbine nozzle component at an aft end of the transition duct, the method comprising:

forming plural open cooling channels on an exterior surface of said transition duct at said aft end thereof, said plural cooling channels extending from an aft edge of said duct in an upstream direction, said plural cooling channels terminating at inlets within said aft end;

closing at least a portion of said plural open cooling channels with a peripheral closure band to thereby form cooling passageways; and incorporating a brush seal into said closure band, said brush seal surrounding said closure band and said aft end of said transition duct, and adapted to engage the turbine nozzle component.

9. The method of claim 8 wherein said cooling channels have substantially rectangular cross-sectional shapes.

10. The method of claim 8 wherein said inlets to said open cooling channels are tapered in an axial direction.

11. The method of claim 10 wherein said peripheral closure band does not enclose said tapered inlets.

12. The method of claim 8 including forming said plural open cooling channels are with means for enhancing heat transfer.

13. The method of claim 8 wherein including forming said closure band with plural cooling apertures overlying one or more of said plural open cooling channels.

* * * * *

UNITED STATES PATENT AND TRADEMARK OFFICE

CERTIFICATE OF CORRECTION

PATENT NO. : 8,186,167 B2
APPLICATION NO. : 12/216515
DATED : May 29, 2012
INVENTOR(S) : Chila et al.

It is certified that error appears in the above-identified patent and that said Letters Patent is hereby corrected as shown below:

At column 2, line 46, delete both instances of “seal 36” and insert --seal 37--

Signed and Sealed this
Thirty-first Day of July, 2012

David J. Kappos
*Director of the United States Patent and Trademark Office*